United States Patent [19]

Stemme et al.

[11] 4,251,141

[45] Feb. 17, 1981

[54] SHUTTER-DIAPHRAGM SYSTEM WITH LIGHT-TOTALIZING CIRCUIT

[75] Inventors: Otto Stemme, Munich; Eduard Wagensonner, Aschheim, both of Fed. Rep. of Germany

[73] Assignee: AGFA-Gevaert, A.G., Leverkusen, Fed. Rep. of Germany

[21] Appl. No.: 29,912

[22] Filed: Apr. 16, 1979

[30] Foreign Application Priority Data

Apr. 18, 1978 [DE] Fed. Rep. of Germany ....... 2816861

[51] Int. Cl.³ .......................... G03B 7/097; G02F 1/13
[52] U.S. Cl. .................................... 354/23 D; 354/29; 354/60 A; 354/227; 350/331 R; 350/336
[58] Field of Search .................. 354/23 D, 29, 30, 43, 354/44, 60 A, 227, 36, 38, 51, 50; 350/331, 336; 328/48

[56] References Cited

U.S. PATENT DOCUMENTS

| 3,202,837 | 8/1965 | Baracket | 328/48 |
|---|---|---|---|
| 3,476,029 | 11/1969 | Schreckendgust | 354/227 |
| 3,548,203 | 12/1970 | Basse et al. | 328/48 |
| 3,889,278 | 6/1975 | Takahata et al. | 354/23 D X |
| 3,892,471 | 7/1975 | Biermann et al. | 350/336 |
| 3,945,025 | 3/1976 | Stempeck | 354/29 |
| 3,981,559 | 9/1976 | Chanin | 350/336 |
| 3,992,098 | 11/1976 | Wirtz | 354/60 A X |
| 3,997,905 | 12/1976 | Iwata et al. | 354/44 X |
| 4,054,890 | 10/1977 | Shimomura | 354/227 |

Primary Examiner—Donald A. Griffin
Assistant Examiner—William B. Perkey
Attorney, Agent, or Firm—Michael J. Striker

[57] ABSTRACT

During the course of an exposure, the camera's exposure aperture progressively increases in size and then is blocked to terminate the exposure in response to a terminate-exposure signal. A light-dependent pulse generator including a photoelement exposed to scene light generates a pulse train whose pulse repetition frequency varies as a function of scene light. A light-totalizing counter receives and counts pulses of such pulse train during the course of an exposure and generates a terminate-exposure signal when a predetermined number of pulses has been counted. A frequency-modifying circuit is operative as the exposure aperture progressively increases in size during an exposure for effecting a corresponding and compensatory progressive increase of the light-dependent repetition frequency of the pulses counted by the counter means.

21 Claims, 6 Drawing Figures

SHUTTER-DIAPHRAGM SYSTEM WITH LIGHT-TOTALIZING CIRCUIT

BACKGROUND OF THE INVENTION

The present invention concerns shutter-diaphragm systems provided with light-totalizing circuitry. In such systems, during the course of the exposure itself, the exposure aperture of the camera progressively increases in size, and a scene-light-dependent timing circuit generates a totalized-light signal which upon reaching a predetermined value causes a terminate-exposure signal to be generated, followed by blocking of the exposure aperture. In such systems, the totalized-light signal should vary not only in dependence upon the scene-light level per se, but furthermore in dependence upon the progressive size increase of the exposure aperture occurring during the course of the exposure.

SUMMARY OF THE INVENTION

It is a general object of the invention to provide a shutter-diaphragm system of the type just identified with a novel light-totalizing circuit which, in a novel way, produces a totalized-light signal which builds up at a rate dependent upon the scene-light level but additionally dependent upon the progressive aperture size increase occurring during the course of an exposure.

In accordance with one broad feature of the present invention, a light-totalizing counter counts pulses received from a pulse generator, the latter including photosensitive means exposed to scene light and operative for producing a pulse train whose frequency varies in dependence upon scene light. Frequency-modifying means is operative during the course of an exposure for effecting a progressive increase of the light-dependent frequency of the pulses counted by the light-totalizing counter corresponding to and compensating for the progressive aperture size increase which occurs during the course of the exposure.

The present invention additionally provides a number of novel implementation techniques for implementing this broad feature of the invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF PREFERRED EMBODIMENTS

Figures 1A, 1B:
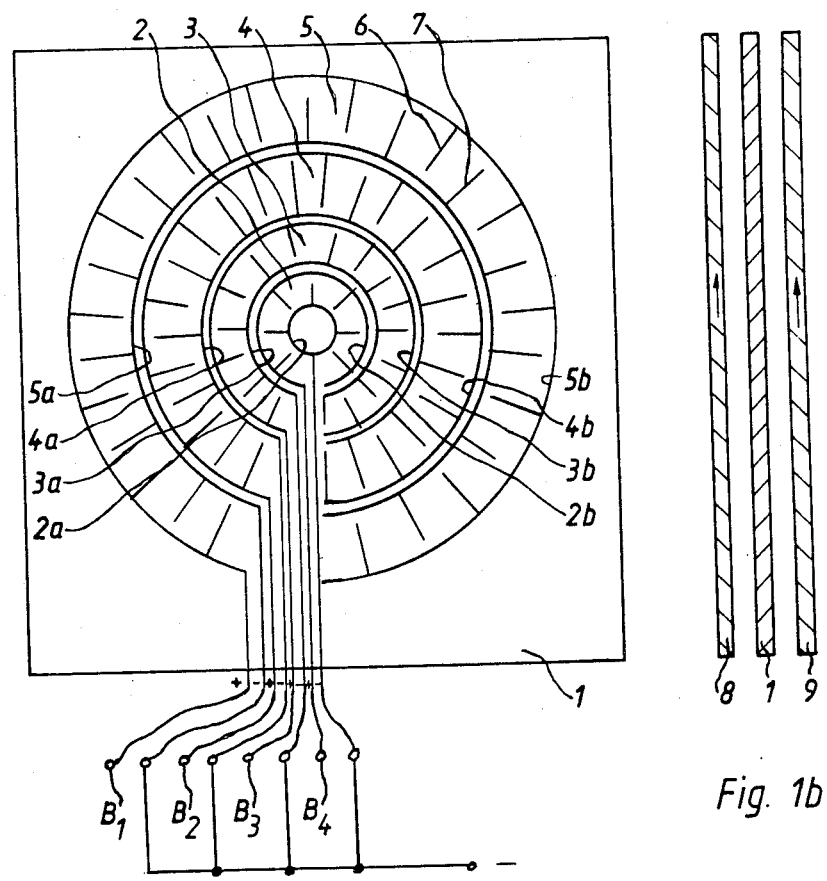
FIGS. 1a, 1b, 2 and 3 together depict a first exemplary embodiment of the invention.

In FIGS. 1a and 1b, numeral 1 denotes in toto an electrooptic diaphragm comprised, for example, of liquid-crystal or ferroelectrical material. Electrooptic diaphragm 1 is comprised of four main annular zones 2, 3, 4 and 5. The individual main annular zones 2, 3, 4, 5 are defined by respective inner electrode rings 2a, 3a, 4a, 5a, and by respective outer electrode rings 2b, 3b, 4b, 5b. Additionally, the electrooptic diaphragm 1 comprises secondary or intermediate annular zones; the first between electrode rings 2b and 3a, the second between electrode rings 3b and 4a, and the third between electrode rings 4b and 5a. All the inner electrode rings 2a-5a are connected to a common potential, for example as shown the negative terminal of a (non-illustrated) battery. The outer electrode rings 2b-5b are connected to respective ones of four terminals B1, B2, B3, B4, to individual ones of which control voltage can be applied in order to change the electrooptical states of individual ones of the four main zones 2-5, e.g., to render individual ones of the four main zones 2-5 simply transparent in the case of the use of liquid-crystal material for example. The electrooptic diaphragm 1 can, for example, be essentially comprised of two transparent plates between which the radial succession of electrode rings 2a-5a and 2b-5b are firmly confined, with the electrooptic material of the diaphragm 1 likewise confined between the two plates and filling all the space intermediate radially successive ones of the electrode rings 2a-5a and 2b-5b.

When positive control voltage is applied via terminal B1 to the outer electrode ring 2b of smallest annular zone 2, the electrooptical state of zone 2 is altered; additionally, the electrooptical state of the intermediate annular zone between electrode ring 2b and next-outer electrode ring 3a is similarly altered, resulting in a change of electrooptical state of all the material radially intermediate electrode ring 2a and electrode ring 3a. If positive control voltage is applied via terminals B1 and B2 to both the outer electrode ring 2b of smallest main annular zone 2, and also to the outer electrode ring 3b of next-larger main annular zone 3, then the electrooptical state of main zone 3 is thusly altered, too; furthermore, the electrooptical state of the intermediate zone between electrode rings 3b and 4a is likewise altered, resulting in a change of electrooptical state of all the electrooptic material radially intermediate electrode ring 2a and electrode ring 4a.

To increase and improve the field-strength distribution within the electrooptic material intermediate the inner and outer electrode rings 5a, 5b of main annular zone 5, inner electrode ring 5a is provided with a comb-like arrangement of radially outwardly extending electrode segments 7, and outer electrode ring 5b is provided with a comb-like arrangement of radially inwardly extending electrode segments 6. The other pairs of electrode rings 2a and 2b, 3a and 3b, 4a and 4b are likewise provided with such radially inwardly and outwardly extending electrode segments, for the same purpose.

The electrooptic material radially inward of radially innermost electrode ring 2a is uncontrolled with regard to its electrooptical state, being bounded only by electrode ring 2a, and is allowed to permanently remain in a state resulting in non-transparency of this innermost circular zone of the diaphragm 1. The surface area of this innermost circular zone is made as small as possible, much smaller than the surface area of the surrounding main annular zone 2, in order that this very small circular zone of non-transparency not be perceptible in a photograph made through the diaphragm 1.

As shown in FIG. 1b, the electrooptic diaphragm 1 can be located intermediate two polarization filters 8 and 9 whose respective polarization directions are rotated by 90° relative to each other.

As shown in FIG. 21 the four control-voltage terminals B1–B4 already mentioned are connected to respective outputs of a gating network.

In particular, the control-voltage terminal B4 associated with the smallest annular zone is connected to the output of an OR-gate 10, whose first input is connected to the output of an AND-gate 11, the second input of OR-gate 10 being connected to the output of an AND-gate 12, its third input being connected to the output of an AND-gate 13, and its fourth input being connected to the output of an AND-gate 14.

The control-voltage terminal B4 associated with the second-smallest annular zone is connected to the output of a second OR-gate 15. OR-gate 15 has its first input connected to the output of AND-gate 12, its second input to the output of AND-gate 13, and its third input to the output of AND-gate 14.

The control-voltage terminal B2 of the next-larger annular zone is connected to the output of a third AND-gate 16. AND-gate 16 has its first input connected to the output of AND-gate 13, and its second input to the output of AND-gate 14.

The control-voltage terminal B1 associated with the largest annular zone is connected directly to the output of AND-gate 14.

The AND-gates 11, 12, 13, 14 are controlled by a digital counter 17 whose counting input is connected via an AND-gate 18 to a pulse generator 19. The other input of AND-gate 18 is connected to the output of a storage flip-flop 20, preferably an RS-flip-flop. The control input of flip-flop 20 is connectable to positive voltage by means of a switch 21.

In the illustrated embodiment, the diaphragm 1 is used not only as a diaphragm, but additionally to terminate exposures, with the successively more outwards zones of the diaphragm being rendered transparent one after the next and cumulatively, and with all of them being rendered non-transparent simultaneously to terminate the exposure. Accordingly, here, the frequency of pulse generator 19 establishes the speed with which the opening-up of the shutter-diaphragm 1 proceeds. The electrooptic diaphragm 1 can, for example, be located behind a conventional shutter which opens preliminary to the start of an exposure while diaphragm 1 is still entirely non-transparent, and then closes subsequent to completion of the exposure after diaphragm 1 has been rendered entirely non-transparent once more.

Counter 17 has a first output A1 connected to the first input of AND-gate 11, via an inverter 22 connected to the first input of AND-gate 12, and connected to the first input of AND-gate 13 directly. The second output A2 of counter 17 is connected via an inverter 23 to the second input of AND-gate 11, to the second input of AND-gate 12 directly, and to the second input of AND-gate 13 directly. The third output A3 of the counter 17 is connected via an inverter 24 to the third input of AND-gate 11, to the third input of AND-gate 12 directly, and to the third input of AND-gate 13 directly. The first input of AND-gate 14 is connected via an inverter 22 to the first output A1 of counter 17, its second input via the inverter 23 to the second output A2 of counter 17, and its third input to the third output A3 of counter 17 directly.

Additionally, outputs A1 and A3 of counter 17 are connected to the first and third inputs of an AND-gate 25 directly, and output A2 of the counter is connected to the second input of AND-gate 25 through the intermediary of the inverter 23. The output of AND-gate 25 is connected to one input of an OR-gate 26, whose output is connected to the reset input R of the aperture-opening counter 17. In the illustrated circuit, after the outermost and last of the annular zones of the diaphragm has been rendered transparent, a "1" signal is produced at the output of AND-gate 25, causing aperture-opening counter 17 to reset. As a result, after the completion of an aperture-opening counting cycle by counter 17, negative voltage becomes applied to all control terminals B1–B4 and the entire diaphragm 1 is rendered non-transparent.

The output of AND-gate 25 is additionally connected to the reset input of flip-flop 20, as a result of which this flip-flop reverts to its starting setting, disabling ANd-gate 18, after completion of the aperture-opening cycle, preventing further pulses from being transmitted from pulse generator 19 to aperture-opening counter 17.

Figure 3:
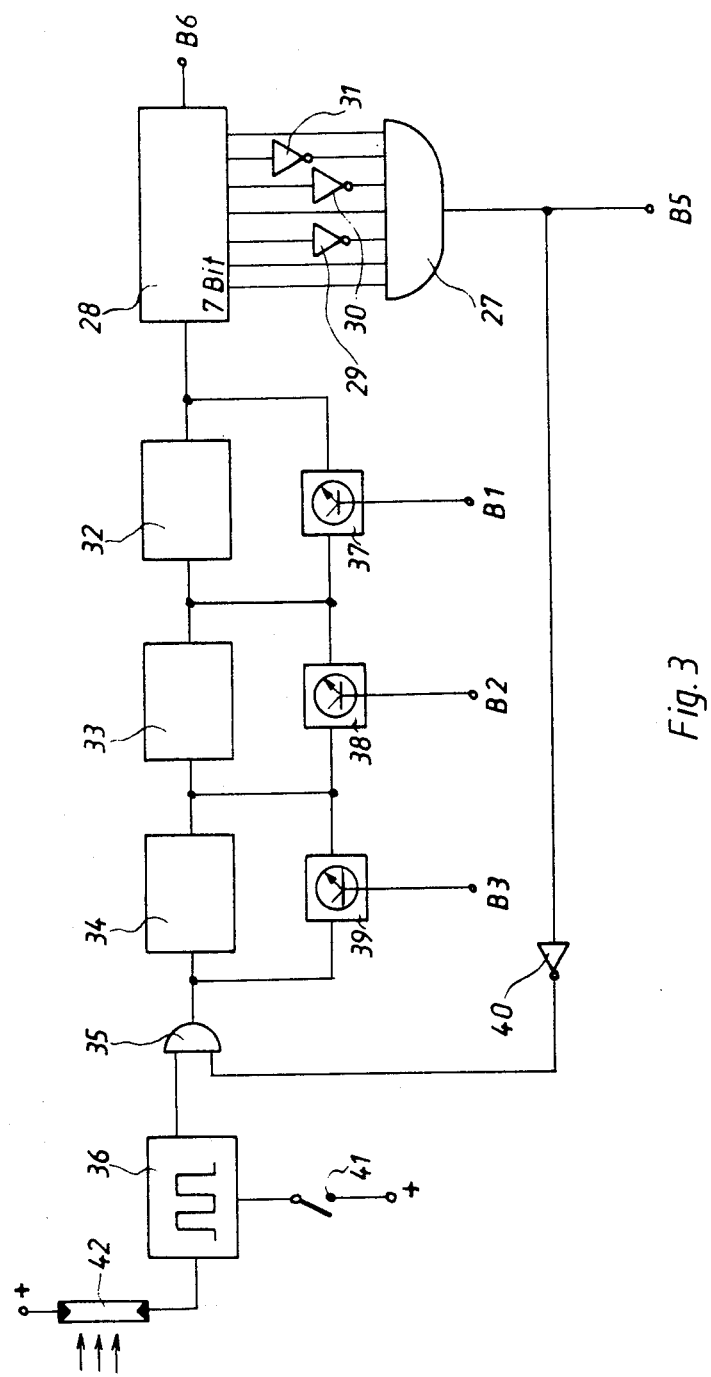

The left input B5 of OR-gate 26 is, as shown in FIG. 3, connected to the output of an AND-gate 27 of a scene-light totalizing circuit. Additionally, the output of AND-gate 25 is connected via terminal B6 to the reset input of a 7-bit counter 28 contained within the totalizing circuit of FIG. 3.

Light-totalizing counter 28 has seven outputs, of which the first, second, fourth and seventh are connected without intermediary to respective inputs of the AND-gate 27, with the third, fifth and sixth outputs being connected to inputs of AND-gate 27 via respective inverters 29, 30 and 31.

The counting input of light-totalizing counter 28 is connected to the output of a chain of three frequency-dividing stages 32, 33, 34, the input of which is connected to the output of an AND-gate 35. The upper input of AND-gate 35 is connected to the output of a pulse generator 36. The period of the pulse train produced by pulse generator 36 is low compared to the intervals elapsing between the rendering transparent of one diaphragm zone and the rendering transparent of the next diaphragm zone.

The frequency-dividing stages 32, 33, 34 can be individually bypassed by respective ones of three semiconductor switches 37, 38, 39. The control input of semiconductor switch 37 is connected via terminal B1 to the output of AND-gate 14 (FIG. 2), the control input of switch 38 to the output of OR-gate 16, and the control input of switch 39 to the output of OR-gate 15.

The output of AND-gate 27 is connected via an inverter 40 to the lower input of AND-gate 35.

Numeral 41 denotes a switch-on contact for pulse generator 36. The frequency of the pulse train produced by pulse generator 36 is determined by a photoresistor 42, or other equivalent light detector, exposed to scene light. The light-dependent resistance of photoresistor 42 causes the frequency of the pulse train produced by pulse generator 36 to be scene-light-dependent. The frequency of the pulse train which pulse generator 36 produces for a midway scene-light level is selected large relative to the frequency of the pulse train produced by the pulse generator 19 of the aperture-opening circuit of FIG. 2. Additionally, the frequency of pulse generator 37 should be designed to be sizable relative to that of pulse generator 19 even for low scene-light levels, e.g., such as are at the limit of the range in which hand-held as opposed to tripod exposures can still be made, in order to assure sufficient resolution and accuracy of the system.

When switch 21 is closed at the initiation of an exposure, a "1" signal is applied to the left input of AND-gate 18, enabling it for pulse transmission, and each pulse produced by pulse generator 19 is counted by aperture-opening counter 17. After a predetermined number of pulses have been counted, a "1" signal is produced at the output of AND-gate 11. In the illustrated circuit, this occurs when the outputs A1, A2, A3 of counter 17 respectively carry "1", "0" and "0" signals. A "1" signal appears at the output of OR-gate 10, with the result that diaphragm zone 2, and also the intermediate zone between contact rings 2b and 3a, becomes transparent.

Then, when counter 17 reaches a count at which its outputs A1, A2, A3 respectively carry "0", "1" and "0" signals, a "1" signal appears at the output of AND-gate 12, so that "1" signals are present both on the output of OR-gate 10 and now also on the output of OR-gate 15. As a result, both diaphragm zone 2 (and the intermediate zone just radially outwards of it) and also diaphragm zone 3 (and the intermediate zone just radially outwards of it) are now transparent.

Then, when counter 17 reaches a count at which its outputs A1, A2, A3 respectively carry "1", "1" and "0" signals, a "1" signal appears at the output of AND-gate 13. As a result, each of the three main diaphragm zones 2, 3, 4 is now transparent, as well as the three intermediate zones located just radially outwards of respective ones of these main zones.

When counter 17 reaches a count at which its outputs A1, A2, A3 respectively carry "0", "0" and "1" signals, a "1" signal furthermore appears at the output of AND-gate 14, as a result of which all four main diaphragm zones 2, 3, 4, 5, and the three intermediate zones between neighboring pairs of them, are now transparent.

When thereafter counter 17 reaches a count at which its outputs A1, A2, A3 respectively carry "1, "0" and "1" signals, a "1" signal is furthermore produced at the output of AND-gate 25, and from there is applied via OR-gate 26 to the reset input of aperture-opening counter 17, resetting the latter, i.e., if this has not already occurred by virtue of an earlier application of a "1" signal to input B5 of OR-gate 26.

Figure 2:
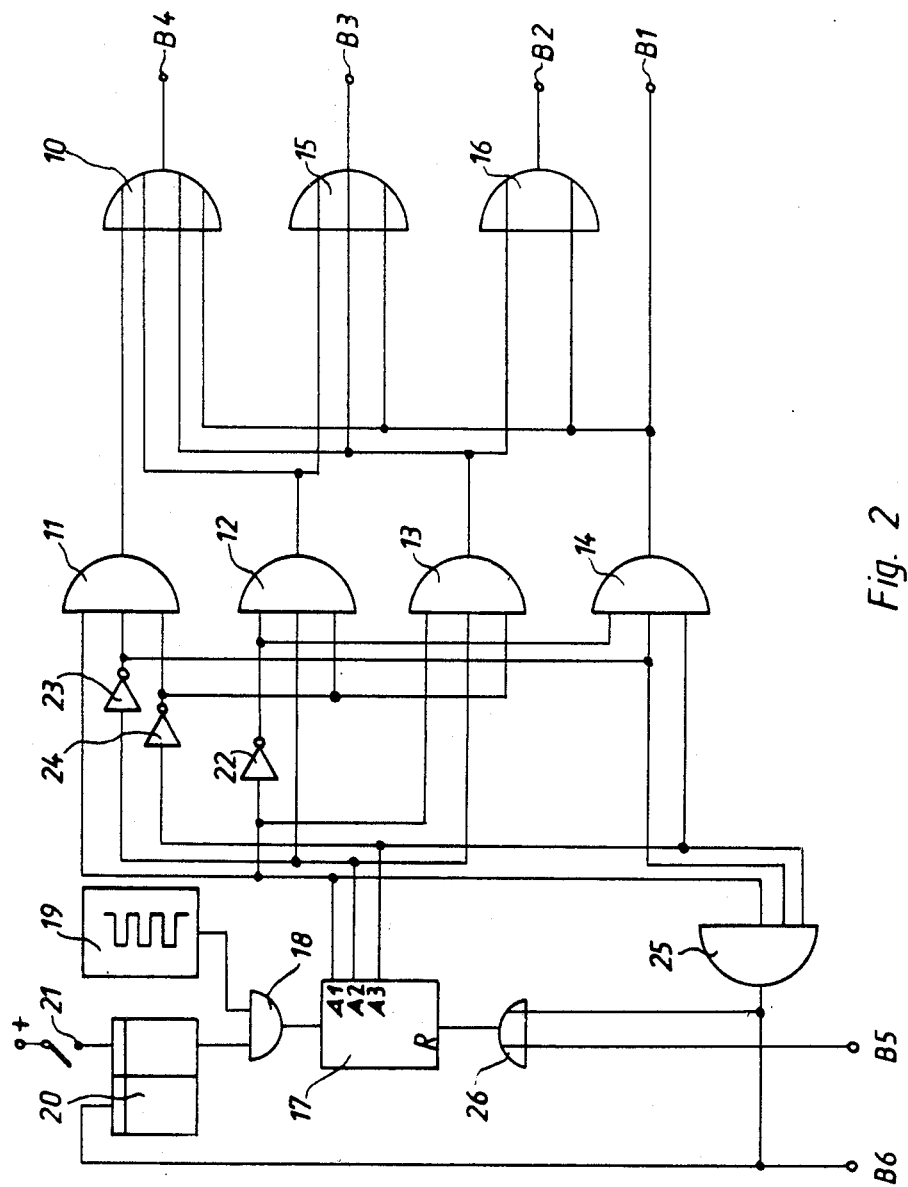

Switch-on contact 41 of the light-totalizing circuit of FIG. 3 closes simultaneously with switch 21 of FIG. 2. The light-dependent-frequency pulse generator 42, 36 transmits pulses via the AND-gate 35 and the chain of frequency dividers 34, 33, 32 to the counting input of light-totalizing counter 28. In the illustrated embodiment, by way of example, each frequency divider 32, 33, 44 is a frequency halver, and the surface areas of the radially outwardly successive diaphragm zones, 2, 3, 4, 5 are such that, each time the radially outward next zone becomes transparent, this doubles the transparent surface area of the diaphragm. Accordingly, after zone 2 has been rendered conductive, when zone 3 is rendered conductive too, this doubles the aperture area previously unblocked by zone 2 alone. The "1" signal produced at this point on terminal B3 of FIG. 2 is furthermore applied to the control input of semiconductor switch 37, rendering the latter conductive and thereby bypassing frequency halver 32. As a result, the frequency of the pulse train applied to light-totalizing counter 28 is doubled, to take into account the doubling of the transparent surface area of the diaphragm.

When the third diaphragm zone 4 becomes transparent too, the "1" signal produced at terminal B2 renders switch 38 conductive, bypassing frequency halver 33, and thereby once more doubling the frequency of the pulse train transmitted to light-totalizing counter 28.

When the last diaphragm zone 5 also becomes transparent, a "1" signal is applied to switch 39, bypassing frequency halver 34 as well, thereby effecting a further doubling of the frequency of the pulse train counted by the light-totalizing counter, in correspondence to this further doubling of the transparent surface area of the diaphragm.

Figure 4:
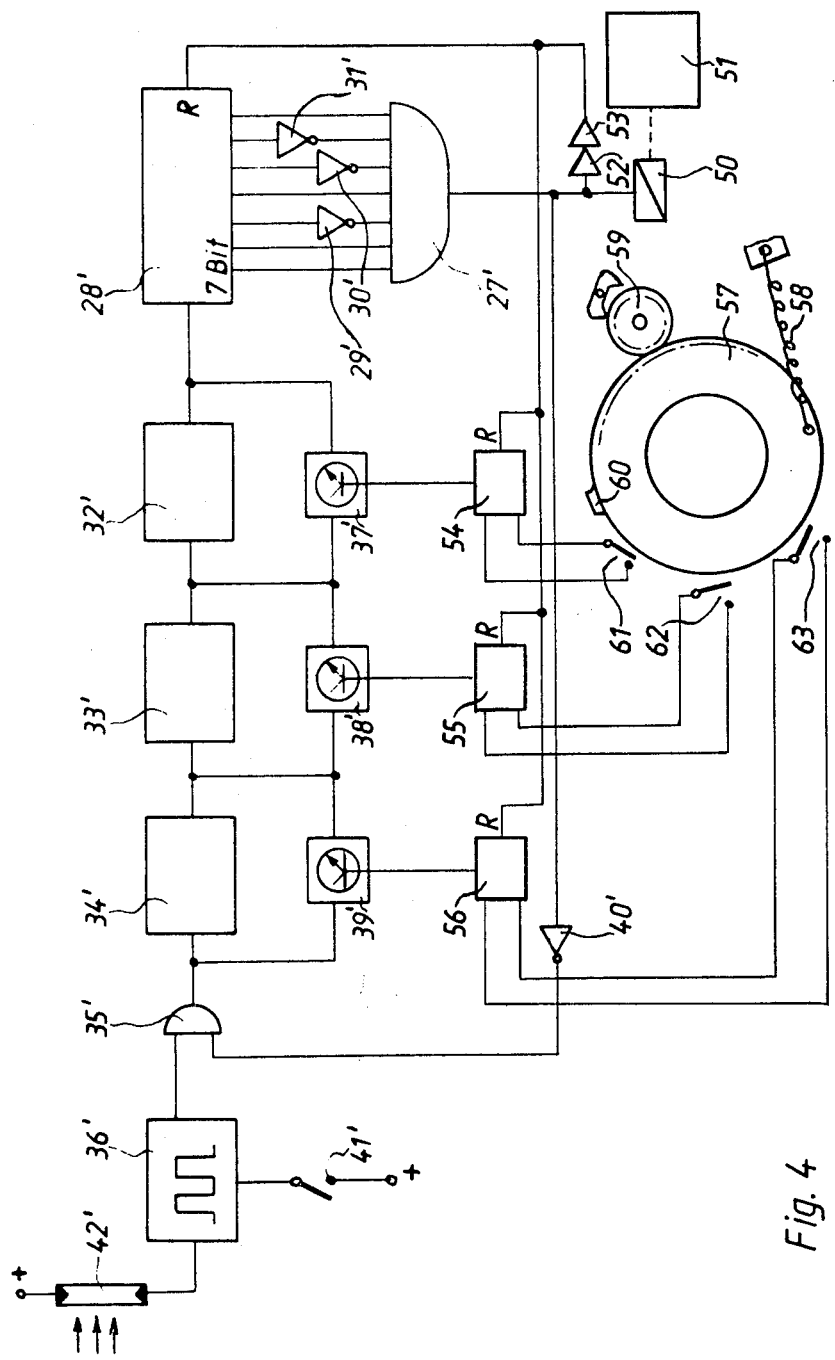
FIG. 4 depicts a second exemplary embodiment of the invention.

In the embodiment depicted in FIG. 4, components corresponding to those of the embodiment already described are denoted by the same reference numerals as there, but primed. In this embodiment, the electrooptic zone diaphragm of FIG. 1a is not present, and instead the camera makes use of a more conventional mechanical shutter-diaphragm whose unblocked aperture area progressively increases during the course of an exposure. An electromagnet 50 is connected in the output circuit of AND-gate 27', and when the latter produces a "1" signal electromagnet 50 becomes deenergized, permitting an aperture-reblocking member 51 to abruptly close or block the camera's exposure aperture. The output of AND-gate 27' is additionally connected via a time-delay chain 52, 53 to the reset input R of the light-totalizing counter 28'.

The control input of semiconductor switch 37' is connected to the output of a flip-flop 45, the control input of semiconductor switch 38' to the output of a flip-flop 55, and the control input of semiconductor switch 39' to the output of a flip-flop 56.

Numeral 57 denotes the schematically depicted aperture-unblocking structure of the camera's shutter-diaphragm. Aperture-unblocking structure 57 is driven by a drive spring 58 and its motion retarded by a motion-retarding mechanism 59. Aperture-unblocking structure 57 is provided with a control projection 60 which activates successive ones of a succession of electric control switches 61, 62 and 63. Control switch 61 is connected to the signal input of flip-flop 54, control switch 62 to that of flip-flop 55, and control switch 63 to that of flip-flop 56.

Control switch 61 is so located that it is closed after the progressively increasing unblocked-aperture area of the aperture-unblocking structure 57 has doubled relative to the smallest aperture size and the initial frequency with which light-dependent pulse generator 42', 62' issues output pulses. When switch 61 closes, flip-flop 54 becomes set and semiconductor switch 37' is rendered conductive. As a result, the repetition frequency of the light-dependent pulse train applied to the counting input of light-totalizing counter 28', whatever its light-dependent value, is now doubled to take into account the doubling of the unblocked aperture surface area.

Subsequently, when the unblocked surface area has doubled relative to the value which it had at the time of closing of control switch 61, control switch 62 is reached and closed by control projection 60, setting flip-flop 55 and rendering semiconductor switch 38' conductive. This effects a second doubling of the frequency of the light-dependent pulse train transmitted to light-totalizing counter 28'. Lastly, control switch 63 is closed by control projection 60, setting flip-flop 56 and rendering semiconductor switch 39' conductive, effecting a third doubling of the light-dependent frequency of the pulse train transmitted to counter 28'. In particular, control switch 63 is closed when the unblocked aperture surface area of aperture-unblocking structure 57 has doubled relative to the value which it had at the time of closing of control switch 62.

When counter 28' reaches its final count, a "1" signal appears at the output of AND-gate 27' and shutter-control electromagnet 50 is deenergized, permitting aperture-reblocking structure 51 to abruptly block off the aperture. After a time-delay interval established by time-delay chain 52, 53, counter 28' is reset and so also are the flip-flops 54, 55 and 56. Also, the "1" signal at the output of AND-gate 27' is applied, via inverter 40', as a "0" signal to the lower input of AND-gate 35', disabling the latter so that further pulses from pulse generator 42', 36' cannot be transmitted to counter 28'.

Figure 5:
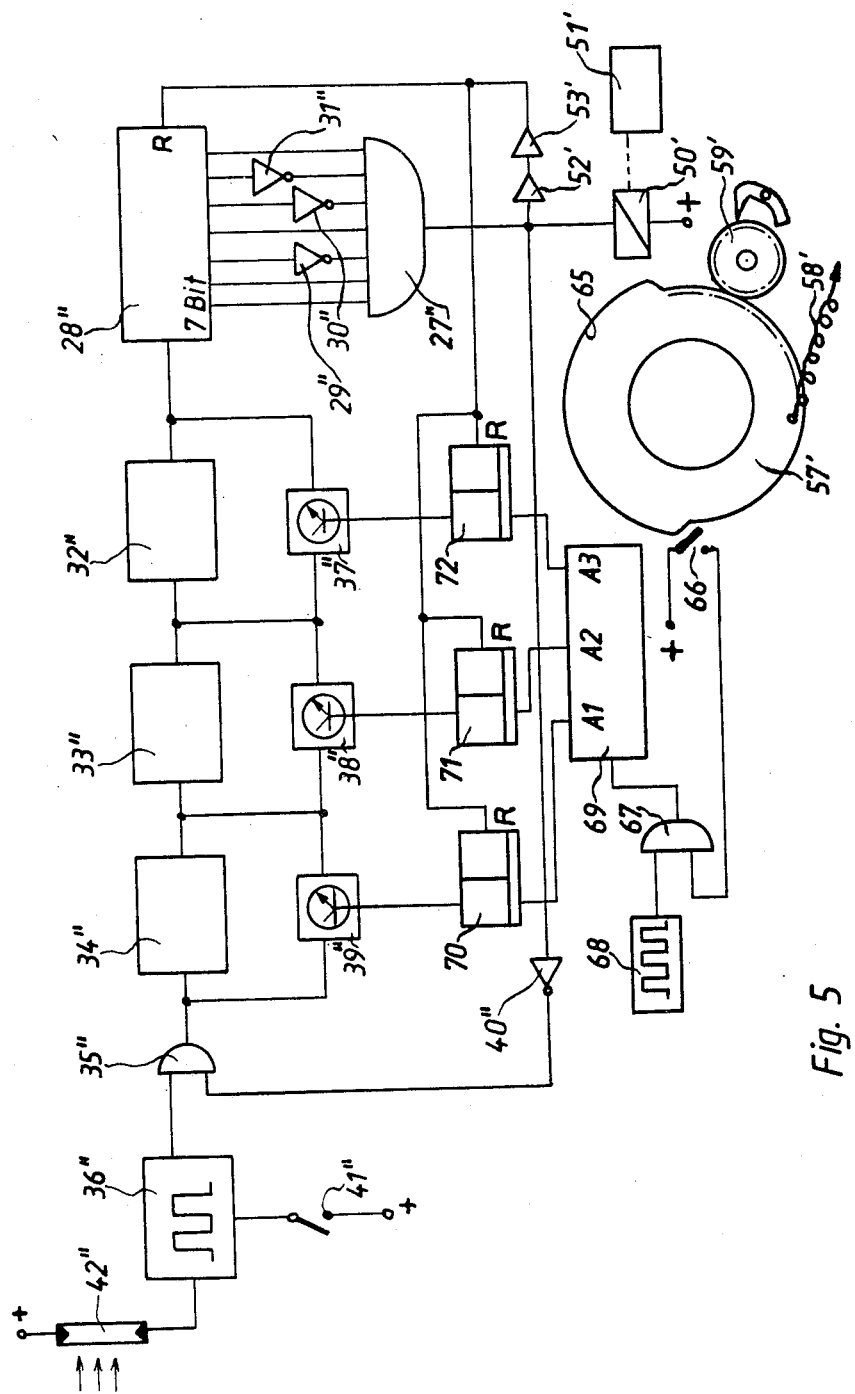
FIG. 5 depicts a third exemplary embodiment of the invention.

In the embodiment depicted in FIG. 5, components corresponding to those of FIG. 4 are denoted by the same reference numerals as there, but with the addition of one prime. The aperture-unblocking structure 57' is provided with a cam 65 which closes a switch 66 at the start of the opening-up of the aperture. When switch 66 closes, an enabling "1" signal is applied to the lower input of an AND-gate 67 and the latter can then transmit pulses from a pulse generator 68 to the counting input of a counter 69. By the time that the aperture has opened up to a predetermined smallest aperture number, the number of pulses counted by counter 69 will be such that a "1" signal appears on its output A1, setting a flip-flop 70 and rendering conductive a hitherto non-conductive semiconductor switch 39''. As a result, the light-dependent frequency of the pulse train transmitted to light-totalizing counter 28'', whatever its value, is now doubled. After a predetermined further number of pulses has been counted by counter 69, the surface of the unblocked aperture of the diaphragm has meanwhile doubled, relative to the value it had at the time of appearance of a "1" signal on output A1 of counter 69, and a "1" signal appears on counter output A2. This sets flip-flop 71 and renders semiconductor switch 38'' conductive, effecting a further doubling of the light-dependent frequency of the pulse train counted by light-totalizing counter 28''. Lastly, when the unblocked aperture surface area has doubled yet once more, a "1" signal appears at output A3 of counter 69, setting flip-flop 72 and rendering semiconductor switch 37'' conductive, thereby effecting a third doubling of the frequency of the pulse train counted by counter 28''.

If, as the aperture-unblocking structure 57' is in the course of opening-up the aperture, or subsequent to complete opening-up of the aperture, light-totalizing counter 28'' reaches a count producing a "1" signal at the output of AND-gate 27'', shutter-control electromagnet 50' is deenergized and the aperture is abruptly blocked off, thereby terminating the exposure. After the elapse of an interval established by time-delay chain 52', 53', light-totalizing counter 28'' becomes reset, as are also the flip-flops 70, 71 and 72, and the AND-gate 35'' will meanwhile have been disabled preventing further transmission of pulses to counter 28.

It will be understood that each of the elements described above, or two or more together, may also find a useful application in other types of circuits and constructions, differing from the types described above.

While the invention has been illustrated and described as embodied in a particular circuits for generating a light-dependent pulse train whose repetition frequency varies both as a function of scene-light level and as a function of the progressive increase in aperture size occurring during the course of an exposure, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. In a photographic camera, in combination, means defining an exposure aperture which progressively increases in size during the performance of an exposure and responding to receipt of a terminate-exposure signal by closing off the aperture to terminate the exposure; light-dependent pulse-generating means including photosensitive means exposed to scene light and operative for generating a pulse train whose pulse repetition frequency varies as a function of scene light; frequency-modifying means operative as the exposure aperture progressively increases in size during an exposure for modifying the pulse train by effecting a corresponding and compensatory progressive increase of the light-dependent repetition frequency of the pulses counted by the counter means; and light-totalizing counter means receiving and counting the pulses of the modified pulse train during the course of an exposure and operative when a predetermined number of pulses has been counted for generating a terminate-exposure signal.

2. In a camera as defined in claim 1, the means defining the exposure aperture comprising command means operative during the performance of an exposure for generating a command signal commanding the exposure aperture to assume progressively increased sizes, the frequency-modifying means receiving the command signal and in response thereto effecting a corresponding progressive increase of the repetition frequency of the pulses counted by the counter means.

3. In a cameras as defined in claim 1, the frequency-modifying means comprising means responding to the progressive aperture size increase by generating a signal indicative of the extent to which the progressive aperture size increase has proceeded and means operative in response to such signal for effecting the progressive increase of the repetition frequency of the pulses counted by the counter means.

4. In a camera as defined in claim 1, the frequency-modifying means comprising means operative as the exposure aperture progressively increases in size during an exposure for effecting a stepwise intermittent progressive increase of the repetition frequency of the pulses counted by the counter means which at least approximates to the progressive aperture size increase.

5. In a camera as defined in claim 1, the means defining the exposure aperture comprising means defining an exposure aperture which increases in size intermittently during the course of an exposure, the frequency-modifying means comprising means operative as the exposure aperture intermittently increases in size during an exposure for effecting a corresponding and compensatory intermittent increase in the repetition frequency of the pulses counted by the counter.

6. In a camera as defined in claim 5, the means effecting the intermittent increase in the repetition frequency comprising means operative for effecting intermittent frequency increases substantially simultaneously with the corresponding intermittent aperture size increases.

7. In a camera as defined in claim 5, the means effecting the intermittent increases in the repetition frequency comprising means operative for effecting the intermittent frequency increases during the intervals intermediate successive intermittent aperture size increases.

8. In a camera as defined in claim 1, the frequency-modifying means comprising a chain of bistable circuit stages connected between the pulse-generating means and the light-totalizing counter means and transmitting pulses to the latter from the former and means operative for changing by one the number of operative ones of the bistable circuit stages each time the exposure aperture doubles in area during the course of an exposure.

9. In a camera as defined in claim 8, the means changing the number of operative bistable circuit stages comprising a plurality of electronic bypass switches each connected to bypass a respective bistable circuit stage when rendered conductive, and means operative for applying to the electronic bypass switches control voltage rendering the bypass switches conductive in cumulative succession during the course of an exposure.

10. In a camera as defined in claim 8, furthermore including a gate having an output and a first input connected to form part of a signal transmission path which includes the chain of bistable circuit stages and extends from the pulse-generating means to the light-totalizing counter means, the gate having a second input, and means connected to the second input of the gate and to the output of the counter means and operative when the counter means has reached a predetermined count for applying to the second input of the gate a signal disabling the gate.

11. In a camera as defined in claim 10, the first input of the gate being connected to the output of the pulse-generating means and the output of the gate being connected to the input of the chain of bistable circuit stages.

12. In a camera as defined in claim 9, the means defining the exposure aperture comprising an aperture-unblocking structure and means operative for displacing the aperture-unblocking structure during the course of an exposure in a manner effecting a progressive increase of the size of the exposure aperture during the course of the exposure, the means rendering the bypass switches conductive being responsive to displacement of the aperture-unblocking structure.

13. In a camera as defined in claim 12, the frequency-modifying means including a plurality of flip-flops each provided with a respective one of the electronic bypass switches, the aperture-unblocking structure being provided with a control portion which shares the displacement of the aperture-unblocking structure, the means rendering the bypass switches conductive comprising a set of switches located in succession along the path of displacement of the control portion and each connected to a respective flip-flop for causing the latter to render conductive the associated bypass switch when reached by the control portion.

14. In a camera as defined in claim 9, including a pulse generator and an aperture-opening counter counting the pulses produced by the pulse generator during an exposure and assuming successive counts each indicating the degree to which the exposure aperture has opened up during the progressive exposure aperture size increase, and means responsive to the successive counts of the aperture-opening counter for rendering successive ones of the bypass switches conductive.

15. In a camera as defined in claim 1, the means defining the exposure aperture including an electrooptic diaphragm comprised of a radial succession of annular electrodes defining intermediate themselves a radial succession of annular zones containing electrooptic material, and means operative for changing the electrooptical state of the material within a cumulative succession of radially more outward ones of the zones by applying potential difference across predetermined pairs of annular electrodes.

16. In a camera as defined in claim 15, the means changing the electrooptical state of the material comprising a pulse generator, an aperture-opening counter counting the pulses produced by the pulse generator during an exposure and assuming successive counts each commanding an increasing number of radially outwardly successive annular zones to be subjected to a change of electrooptical state, and a gating network having inputs connected to the counter and responsive to the successive counts and having outputs connected to different ones of the annular electrodes and operative for converting the successive counts of the aperture-opening counter into combinations of control potential differences applied across pairs of annular electrodes such as to cause the material of radially outwardly successive annular zones to undergo a change of electrooptical state in cumulative succession.

17. In a camera as defined in claim 16, radially inner electrodes of the successive annular zones forming a first group of electrodes, radially outer electrodes of the successive annular zones forming a second group of electrodes, the means changing the electrooptical state including means maintaining the electrodes of one group at a predetermined reference potential, the outputs of the gating network being connected to the electrodes of the other group and operative for applying thereto control potential differing from the reference potential.

18. In a camera as defined in claim 17, a radially innermost one of the annular electrodes defining radially inward of itself a central circular zone whose surface area is at least one order of magnitude smaller than the surface area of the radially innermost one of the annular zones.

19. In a camera as defined in claim 17, radially inner annular electrodes being provided with a succession of radially outwardly extending electrode segments, radially outer annular electrodes being provided with a succession of radially inwardly extending electrode segments, the radially outwardly extending and the radially inwardly extending electrode segments of each annular zone being interdigitated.

20. In a camera as defined in claim 16, furthermore including means operative for terminating an exposure by resetting the aperture-opening counter in response to the counter reaching a predetermined count.

21. In a camera as defined in claim 20, the means resetting the aperture-opening counter including a gate having an output connected to the reset input of the counter and having a first input and a second input and means responding to the counter reaching a predetermined count by applying to the first input of the gate a signal resetting the counter, the second input of the gate being connected to the light-totalizing counter means for receipt of the terminate-exposure signal produced by the latter.

* * * * *